United States Patent [19]

Crossmore, Jr.

[11] 3,977,892
[45] Aug. 31, 1976

[54] AGGLOMERATION OF FINELY DIVIDED PARTICLES

[75] Inventor: Edward Y. Crossmore, Jr., Shippenville, Pa.

[73] Assignees: Clyde L. Miller, Indiana, Pa.; William C. Leasure, Houston, Tex. ; part interest to each

[22] Filed: Sept. 24, 1973

[21] Appl. No.: 400,002

[52] U.S. Cl. ............................ 106/288 B; 106/306; 106/307; 106/309; 264/117; 106/DIG. 1
[51] Int. Cl.$^2$............................................ C09C 1/28
[58] Field of Search ................ 106/288 B, 306, 307, 106/63, 69, DIG. 1; 252/70; 264/117

[56] References Cited
UNITED STATES PATENTS

| | | | |
|---|---|---|---|
| 2,140,850 | 12/1938 | Palmieri et al.................. | 106/DIG. 1 |
| 2,988,509 | 6/1961 | Schilberg............................ | 252/70 |

Primary Examiner—Patrick P. Garvin
Assistant Examiner—J. V. Howard
Attorney, Agent, or Firm—Larson, Taylor and Hinds

[57] ABSTRACT

Strong aggregates of high density are produced from fine particles by heating said particles, then combining a binder solution comprising a saturated, dendritic crystal-forming aqueous sodium chloride solution heated to a temperature below the temperature of the heated particles, mixing thoroughly said heated particles and said heated binder solution in a ratio of 10 to 20 grams, preferably 14 to 18 grams, of particles per milliliter of binder solution, shaping the resulting mixture under pressure and cooling the shaped mixture to recrystallize said binder solution and provide said agglomerate.

Aggregates of high porosity and strength can be prepared from siliceous materials such as fly ash by heating the product agglomerated to a temperature of 1600°F–1825°F.

20 Claims, No Drawings

AGGLOMERATION OF FINELY DIVIDED PARTICLES

BACKGROUND OF THE INVENTION

1. Field of the Invention

This invention is directed to the production of useful agglomerates or aggregates of finely divided particulate matter.

2. Description of the Prior Art

There is currently produced in the United States untold quantities of finely divided materials which because of their very highly subdivided or dust-like form have little if any utility. The particles are, for all intents and purposes waste or at best semi-waste materials. A good example of such finely divided materials is fly ash which is a by-product of coal-fired boiler power plants, currently being produced in the United States at an estimated rate of 20 to 25 million tons per annum. Considerable money and effort have been expended toward the development of products and/or uses of fly ash both in its generated state or by agglomerating it by various methods. One of the major hurdles which proponents of fly ash utilization have failed to negotiate successfully has been handling and transportation. The material sizes out from minus 60 mesh to a theoretical plus 10,000 and definitely poses serious problems unless properly confined. Special equipment is required and apparently those materials which fly ash is attempting to supplant do not demand what amounts to additional cost. Accordingly, any proposed utilization of this waste material would have to include consideration of the fact that it cannot competitively be handled, stored or transported in its generated state. It must be agglomerated, preferably at a point of origin.

Another hurdle is the rather uneviable position of those industries generating fly ash, notably utilities, who are by far the largest producers. For some 40 years various utilization schemes have been researched either internally or through independent organizations and, although a small measure of divergent product has been obtained, it is quite apparent there is an enormous gap between generation and utilization, and what is even more appalling, it is widening. Dumping of fly ash is costly and proposed anti-pollution activity on the part of political sub-divisions, no matter how laudable, will present additional cost as time passes. The dilema of those generating fly ash is this: They cannot afford to process any less than total ash produced at any one point otherwise dual handling costs add more expense to existing costs. Utilities are unable to market fly ash in any great quantity as raw materials for various uses because of sales expense involved as well as the generally held concept of avoiding competition with customers in these fields. So, any proposal aimed at solution of this problem will have to remove the total ash at any point of generation before a utility could justifiably consider deviation from present practice.

The above discussions of the problems presented by fly ash and the needs which clearly exist for methods of successfully agglomerating the same into useful products applies equally to a host of other products amongst which can be included finely divided particles of refractory and siliceous materials, crystalline materials, combustible carbonaceous materials and the like.

While a variety of agglomerating methods and binders have been heretofore utilized for agglomeration of these fine particles, the methods and products they produce have not been without their shortcomings. It is known, for instance, to utilize sodium chloride as a binder in the agglomeration of such finely divided materials. However, the products obtained by such methods have been disappointedly fragile even where the agglomerated particles have been sintered above the melting point of the particles to effect fusion thereof.

One of the objects of the invention, therefore, is to provide a method for agglomerating finely divided particulate material into strong aggregates of high density.

Another object of the invention is to provide lightweight aggregate which has been heated or roasted to provide a product which possesses an unusually high porosity while maintaining at the same time excellent strength.

Yet another object of the invention is to provide a method of agglomerating waste and semi-waste particulate materials in a convenient fashion so as to alleviate the pollution problems currently caused by the dumping of such materials. An independent analysis of effluent resulting from the dumping of fly ash shows the following:

|  | PARTS PER MILLION |
| --- | --- |
| Fe-Al Acid Salts | 50. |
| CaCO$_3$ | 448. |
| Sulphate | 753. |
| Chloride | 48. |
| Acid Index (ph) | 3.5 |

The raw Fly ash analysis is as follows:

| | |
| --- | --- |
| Moisture | .37% |
| SiO$_2$ | 34.90 |
| Iron-Alumina Oxides | 60.39 |
| CaO | 2.05 |
| MgO | 1.55 |
| Sulphur | .74 |

When one considers the fact that just a single power generating facility introduces waste material, namely fly ash, at a rate of 2,000 tons daily, and this product is composed of the above contaminants, into the environment, subject to the elements at all times, the enormity of the situation emerges. For instance, sulphur, when combined with water produces sulphuric acid. Potentially, a simple calculation results in the realization that some 15 tons of sulphur, leached by water which is inevitable as the particles are minute, eventually will find its home in the water table, and this happens each day. Over a period of a year the final result amounts to a possible 1,358,000 gallons of sulphuric acid siphoning into the already dwindling fresh water supply of the world. Certainly, a sobering prospect, especially upon consideration that this is just one utility station.

These and other objects of the invention will become apparent from the following description of the invention and the appended claims.

SUMMARY OF THE INVENTION

In accordance with the present invention solid, finely-divided particles are agglomerated and shaped by a method comprising preheating the particles to an elevated temperature, preferably a temperature about 150°F to 170°F, separately preheating a binder solution comprising a saturated dendritic crystal-forming aqueous sodium chloride solution to an elevated temperature below the temperature of the preheated particles, thoroughly mixing the preheated particles and preheated binder solution in a ratio of about 10 to 20 grams of particles per milliter of binder solution shaping the resulting mixture preferably about 14 to 18 grams of particles per milliter of binder, under pressure and cooling the shaped mixture to recrystallize said binder solution and provide said agglomerate.

An important feature of the present invention resides in the fact that the binder solution employed is a saturated dendritic crystal-forming aqueous solution of sodium chloride. When this liquid is used as the binder at an elevated temperature, there ensues upon cooling of the saturate liquid a recrystallization that results in the formation of connected crystals, termed a lattice, which cements all the particles of the material into a unity. It is important to note that ordinary saturated sodium chloride solutions are not dendritic or arborescent crystal-forming solutions but rather form individual or unconnected crystals upon recrystallization. As will be demonstrated below in the specific examples set forth, utilization of ordinary saturated sodium chloride solutions in the process of the present invention tends to produce fragile products as compared to the dendritic-crystal forming sodium chloride solutions.

Any treatment or process known in the art for the production of saturated brine solutions which provide mother liquors that tend to result in the growth of dendritic or arborescent crystals can be employed to provide the brine solution of the present invention. A particularly suitable method for providing such dendritic crystal-forming sodium chloride solutions comprises first formulating a saturated mineral rock salt brine aqueous solution and then treating the saturated solution with 1.7 grams of dense soda ash per gallon of the saturated sodium chloride solution followed by the addition of 3.4 grams of lime (CaO) per gallon of the saturated sodium chloride solution. The mixture thus treated is mixed at ambient temperature and permitted to settle. When the mixture has settled the top clear phase of brine is decanted and is ready for use as the binder solution in the method of the present invention.

In accordance with the method of the present invention, the particles and the saturated binder solution are separately preheated prior to being intimately mixed. The preheating in each case is at elevated temperatures but it is preferred the preheating of the saturated binder be conducted at a temperature below that at which the particles are preheated in order to avoid premature recrystallization of the binder solution. Most advantageously preheating of the particles is effected at a temperature of about 150°F to about 170°F, preferably about 155°F to 165°F. Generally the preheating of the binder solution is to a temperature not higher than 5°–15°F below that of the particulate material. The preferred temperature to which the saturated sodium chloride binder solution is preheated is about 150°F.

The intimate mixing of the two components can be effected by any convenient method known in the art including stirring by hand. As aforementioned, in order to obtain an integral unitary product of sufficient strength, the binder solution and particles should be employed in a ratio of about 10 to 20 grams of particles per ml. of binder solution. The preferred ratio ordinarily falls in the range of about 14 to 18 grams of particles per ml. of binder.

After mixing of the particles and binder the resulting mixture is then shaped under pressure and at a temperature above the sodium chloride recrystallization temperature. The pressure employed is that sufficient to reduce the void spaces between particles and permit crystal growth to fill the voids but not so high as to squeeze out so much binder solution that it adversely affects or destroys the bonding effect. In general a pressure of about 20,000 to 25,000 pounds per linear "nip" inch or its equivalent has been found satisfactory. The temperature during the pressurized shaping is generally about that of the mixture of particles and binder.

The preferred method of shaping the mixture of particles and binder solution is by briquetting although any of the other known or conventional shaping methods employed in the art for the formation of similarly bonded products can be employed. These include, for example, pelletizing, compacting, extruding, nodularizing, and stamp pressing, each utilizing the conventional machines employed for the respective processes provided of course that the machines are capable of effecting the necessary pressure.

In the preferred briquetting method of shaping, presses referred to as briquetting machines, for instance, the K. R. Komarek briquetting machines are utilized. The mixture of particles and binder solution is fed into the briquetting machine between pocketed or corrugated rollers and squeezed into the pockets resulting in a briquett structure with a hard surface and a soft interior.

Upon shaping of the mixture of particles and binder solution, the shaped product is permitted to cool for a time sufficient to complete the recrystallization of the sodium chloride binder into dendritic crystals. Ordinarily the recrystallization is completed in a matter of minutes, generally about 10 to 20 minutes. At this point, however, the shaped article may be somewhat plastic and should be further cooled to complete the recrystallization cycle.

The finely divided particles which may be agglomerated in accordance with the method of the present invention include any solid particles having a melting point above 200°F. The size of the particles may vary considerably but usually fall within the range of −20 mesh (U.S. Standard) down to 1 micron, preferably −40 mesh to 1 micron. Ordinarily a particle size beyond −20 mesh provides too large a void space for efficient agglomeration. Among the particles which can be agglomerated according to the present invention may be included siliceous materials such as fly ash, slag, silica and perlite; carbonaceous combustible materials such as coal, charcoal, and coke; crystalline materials such as inorganic salts for instance, rock salts, calcium chloride, potash, gypsum, and calcium carbonate. If desired, mixtures of two or more different or dissimilar particles such as those illustrated above may be agglomerated by the present invention.

As another embodiment of the present invention agglomerates prepared by the method described above can be heated or roasted to provide aggregates of high porosity and excellent strength. In accordance with this aspect of the invention, the shaped article after cooling to effect the recrystallization necessary to effect sufficient bonding of the particle is heated or roasted at a temperature of at least 1600°F but below the softening point of the particles making up the agglomerate. The instances wherein this aspect of the present invention is applicable is where the particles making up the agglomerate are composed of materials chemically reactive with the sodium in the sodium chloride crystals thereby providing additional internal strength by virtue of a bonding reaction. The temperatures at which the heating or roasting is effected should be distinguished from sintering which produces a fusion of particles. No such sintering is effected in the method of the present invention and is in fact detrimental to the ultimate properties desired in the final product produced. The heating temperatures, however, should be sufficient to drive off gaseous products such as chlorine, water vapor and other combustion products that may develop by virtue of the constituents contained in the particulate materials making up the agglomerate. The driving off of the gases results in a final product of high porosity and lightweight and in the case of siliceous particulate matter in a water insoluble product. In the case of siliceous materials it is believed that the heating effected induces a chemical and/or physical reaction that provides a sodium silicate chemical composition that manifests itself in a very rigid hard aggregate as a final product.

The products of the present invention find a number of utilities. For instance, the agglomerated products of the present invention, that is, those which have not been heated or roasted can be agglomerated products of rock salt dust which is found to be a valuable substitute for rock salt in its various applications including the deicing of roads. Similarly, agglomerates of calcium chloride can be utilized as substitutes for calcium chloride in its known applications. Of particular interest are agglomerates formed by using a mixture of rock salt dust and calcium chloride particles. Agglomerates of rock salt/calcium chloride mixtures have been found to have particular utility as deicing chemicals since the deicing effectiveness of this combination has been found to be greater than three times that of rock salt alone.

Aggregates produced by the present invention, that is, agglomerates heated or roasted in accordance with the method of the present invention such as, for example, roasted aggregates of fly ash, silica, slag, etc. have found utility as lightweight aggregates, adsorbing filters, soil conditioners and anti-skid agents.

The following examples are included to further illustrate the present invention. In each of the examples the binder solution employed was prepared in the following manner:

To a saturated mineral rock salt brine solution is added 1.7 grams of dense soda ash per gallon of the brine solution. This is followed by the addition of 3.4 grams of lime (CaO) per gallon of the brine solution. This mixture is mixed at room temperature and allowed to settle until a clear upper phase forms. The clear phase is then decanted off and is ready for use as the binder solution.

EXAMPLE 1

| Rock Salt Dust (−30 Mesh) | 4540 Gr. |
|---|---|
| NaCl Binder | 250 Ml. |

The rock salt dust was heated to 160°F and the binder was heated and saturated at 150°F. The thus heated rock salt dust and binder were then intimately mixed while the temperature was maintained at 160°F. to prevent premature recrystallization. This mixture was then introduced at about 160°F. into a K. R. Komarek briquetting machine and briquetted at a pressure of 24,000 lbs. per lineal "nip"* inch. The resulting 3 inch wide × ⅜ inch thick corrugated ribbon was cooled to provide recrystallization. A hard agglomerate was produced exhibiting the following specific gravity readings:

1. 2.02
2. 2.03
3. 2.07

EXAMPLE II

| Calcium Chloride (+10 Mesh) | 4540 Gr. |
|---|---|
| NaCl Binder | 250 Ml. |

The calcium chloride was preheated to a temperature of 165°F and the binder was preheated and saturated at 150°F. The calcium chloride was mixed with the binder while holding the temperature at 165°F and the mixture was briquetted and cooled as in Example 1. The following Specific Gravity results were obtained on the resulting corrugated ribbon:

1. 1.91
2. 1.94
3. 1.89

*Nip — the "line" of contact between two rolls, such as press, calender or super calender rolls. Owing to the compressibility of the felt and/or the web of paper, the "line" of contact is actually a narrow zone. "The Dictionary of Paper", 3rd Ed; American Paper and Pulp Association, New York, N.Y., 1963 p. 311.

EXAMPLE III

| Rock Salt Dust (−30 Mesh) | 2270 Gr. |
|---|---|
| Calcium Chloride (+10 Mesh) | 2270 Gr. |
| NaCl Binder | 250 Ml. |

Both the rock salt dust and calcium chloride while solids were preheated to 160°F. The binder was preheated to 150°F. The rock salt dust, calcium chloride were mixed, briquetted and cooled as in Example 1. The following Specific Gravity readings were obtained on the resulting product:

1. 1.89
2. 1.87
3. 1.88

EXAMPLE IV

| Potash (−25 Mesh) | 4540 Gr. |
|---|---|
| NaCl Binder | 250 Ml. |

The potash and binder were heated, mixed, briquetted and cooled as in Example 1. The resulting briquetted product exhibited the following Specific Gravity readings:

1. 2.09
2. 2.02
3. 2.08

EXAMPLE V

| Silica (−20 Mesh) | 4540 Gr. |
|---|---|
| NaCl Binder | 250 Ml. |

The silica was heated to 170°F and the binder was heated to 155°F. The silica and binder were then intimately mixed while holding the temperature of the mix at 170°F. The heated mix was then briquetted and cooled as described in Example 1. The Specific Gravity readings of the resulting product were as follows:
1. 2.31
2. 2.31
3. 2.37

EXAMPLE VI

| Fly ash (−80 Mesh) | 4540 Gr. |
|---|---|
| NaCl Binder | 250 Ml. |

The fly ash employed in this example has the following typical composition:

| | Percent |
|---|---|
| $SiO_2$ | 45–50% |
| $Al_2O_3$ | 27–35 |
| $Fe_2O_3$ | 6–14 |
| C | 4–12 |
| CaO | 2–3 |
| Misc. | 9 |

The fly ash, heated to 170°F, was mixed with the binder heated to a temperature of 150°F. and briquetted as described in Example 1. The resulting briquetted product was momentarily cooled and then roasted at a temperature of 1700°F for about 12½ minutes. The roasting permitted escape of the constituents present such as chlorine, water, etc. and cause unification of sodium and silica. There resulted a highly porous stable material having density of approximately 44 lbs./cu. ft. The product analysis was as follows:

| $SiO_2$ | 34.00% |
|---|---|
| Insol. Silicates | 28.72 |
| $Fe_2O$ | 19.72 |
| $Al_2O_3$ | 15.25 |
| CaO | .10 |
| $SO_3$ | .47 |
| Ign. Loss | .82 |
| Alkalis present-Positive flame test | |

It is claimed:
1. A method of agglomerating finely-divided particles selected from carbonaceous combustible materials, siliceous materials and crystalline inorganic materials which comprises preheating said particles to an elevated temperature of about 150° to 170°C, preheating a binder solution comprising a saturated, dendritic crystal-forming aqueous sodium chloride solution to an elevated temperature below the temperature of said preheated particles, mixing thoroughly said preheated particles and said preheated binder solution in a ratio of about 10 to 20 grams of particles per milliliter of binder solution, shaping the resulting mixture under pressure and cooling the shaped mixture to recrystallize said binder solution and provide said agglomerate.

2. The method of claim 1 wherein the ratio of particles to binder solution is about 14 to 18 grams of particles per ml. of binder solution.

3. An aggregate of solid, finely-divided particles selected from carbonaceous combustible materials, siliceous materials and crystalline inorganic materials, bonded together essentially by dendritic sodium chloride crystals, said particles having a particle size of about 1 micron to −20 mesh.

4. The method of claim 1 wherein the aqueous sodium chloride solution is of mineral rock salt.

5. The method of claim 1 wherein the finely divided particles are siliceous materials and the cooled shaped agglomerate is roasted at a material surface temperature of at least about 1600°F.

6. The method of claim 5 wherein the roasting is conducted at a material surface temperature of about 1600°F to 1825°F.

7. The method of claim 6 wherein the siliceous material comprises fly ash.

8. The method of claim 5 wherein the siliceous material is silica.

9. A method of producing shaped agglomerates of finely-divided particles consisting essentially of fly ash which comprises preheating said particles to a temperature of 155°F to 165°F, preheating a binder solution comprising a saturated, dendritic crystal-forming sodium chloride solution to a temperature of about 150°F, mixing thoroughly said preheated particles and said saturated binder solution in a ratio of about 14 to 18 grams of particles per milliliter of solution, shaping the mixture under a pressure of 20,000 to 25,000 lbs/lineal nip inch, cooling the shaped mixture to recrystallize said binder and roasting the resulting shaped agglomerate at a material surface temperature of about 1600°F to 1825°F.

10. The method of claim 9 wherein the aqueous sodium chloride solution is of mineral rock salt.

11. The method of claim 9 wherein the roasting temperature is 1625°F to 1700°F.

12. The method of claim 9 wherein the shape is conducted by briquetting.

13. The method of claim 1 wherein the particles size is about 1 micron to minus 20 mesh.

14. The method of claim 1 wherein the particle size is about 1 micron to minus 40 mesh.

15. The method of claim 1 wherein the particles comprise crystalline inorganic materials.

16. The method of claim 15 wherein the crystalline inorganic material is rock salt.

17. The method of claim 15 wherein the crystalline inorganic material is calcium chloride.

18. The method of claim 15 wherein the crystalline inorganic material is a mixture of rock salt and calcium chloride.

19. The method of claim 1 wherein the particles are comprised of carbonaceous combustible materials.

20. The method of claim 1 wherein the finely-divided particles are coal particles.

* * * * *